(12) United States Patent
Zhan et al.

(10) Patent No.: US 8,352,999 B1
(45) Date of Patent: Jan. 8, 2013

(54) METHOD FOR MANAGING DATA IN A SHARED COMPUTING ENVIRONMENT

(75) Inventors: Kaijun Zhan, Pleasanton, CA (US); James Harper, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 952 days.

(21) Appl. No.: 11/490,676

(22) Filed: Jul. 21, 2006

(51) Int. Cl.
*H04L 29/06* (2006.01)

(52) U.S. Cl. ............ 726/1; 713/165; 713/166; 713/167; 713/193

(58) Field of Classification Search ........................ 726/1
See application file for complete search history.

(56) References Cited

U.S. PATENT DOCUMENTS

| | | | | |
|---|---|---|---|---|
| 5,455,953 A | * | 10/1995 | Russell | 710/266 |
| 5,566,326 A | * | 10/1996 | Hirsch et al. | 703/26 |
| 5,664,098 A | * | 9/1997 | Bianchi et al. | 726/16 |
| 5,758,343 A | | 5/1998 | Vigil et al. | |
| 6,009,103 A | | 12/1999 | Woundy | |
| 6,016,499 A | | 1/2000 | Ferguson | |
| 6,049,799 A | * | 4/2000 | Mangat et al. | 1/1 |
| 6,061,448 A | | 5/2000 | Smith et al. | |
| 6,073,175 A | | 6/2000 | Tav et al. | |
| 6,073,242 A | * | 6/2000 | Hardy et al. | 726/1 |
| 6,081,900 A | | 6/2000 | Subramaniam et al. | |
| 6,085,188 A | | 7/2000 | Bachmann et al. | |
| 6,088,796 A | | 7/2000 | Cianfrocca et al. | |
| 6,105,131 A | | 8/2000 | Carroll | |
| 6,119,137 A | | 9/2000 | Smith et al. | |
| 6,128,742 A | * | 10/2000 | Felt | 726/5 |
| 6,144,959 A | * | 11/2000 | Anderson et al. | 1/1 |
| 6,154,743 A | | 11/2000 | Leung et al. | |
| 6,161,139 A | * | 12/2000 | Win et al. | 709/225 |
| 6,192,408 B1 | * | 2/2001 | Vahalia et al. | 709/229 |
| 6,339,827 B1 | * | 1/2002 | Stokes et al. | 713/176 |
| 6,591,095 B1 | * | 7/2003 | Palaniswamy et al. | 455/411 |
| 6,675,261 B2 | * | 1/2004 | Shandony | 711/121 |
| 6,883,100 B1 | * | 4/2005 | Elley et al. | 726/5 |

(Continued)

OTHER PUBLICATIONS

Karjoth, Access Control with IBM Tivoli Access Manager, May 2003, ACM Transactions on Information and System Security (TISSEC), vol. 6, Issue 2, pp. 232-257.*

(Continued)

*Primary Examiner* — Thanhnga B Truong
*Assistant Examiner* — Kenneth Chang
(74) *Attorney, Agent, or Firm* — Vista IP Law Group, LLP (57) ABSTRACT

A method of storing secret data in a shared computing environment includes defining secret data, such as a password and administration policies according to a schema of a directory server such as a LDAP server. The secret data and administration polices are centrally stored on the LDAP server. The secret data can be encrypted. Administration polices include authorization and authentication policies, and a security zone can be defined for a collection of entities with a common security characteristic, such as a common password. A security zone defines a group of users and the secret data that can be accessed by the group of users. Multiple security zones can be defined. The secret data can be accessed directly from the server of the directory service without accessing another server or data store assuming the administration policies are satisfied.

24 Claims, 10 Drawing Sheets

U.S. PATENT DOCUMENTS

| | | | |
|---|---|---|---|
| 6,931,532 B1* | 8/2005 | Davis et al. | 713/167 |
| 2002/0078004 A1* | 6/2002 | Ambrosini et al. | 707/1 |
| 2002/0083340 A1* | 6/2002 | Eggebraaten et al. | 713/201 |
| 2002/0129135 A1* | 9/2002 | Delany et al. | 709/223 |
| 2003/0018919 A1* | 1/2003 | Arbab et al. | 713/202 |
| 2003/0041154 A1* | 2/2003 | Tran | 709/229 |
| 2003/0131246 A1* | 7/2003 | Reeves et al. | 713/182 |
| 2003/0142364 A1* | 7/2003 | Goldstone | 358/402 |
| 2003/0163433 A1* | 8/2003 | Lam et al. | 705/71 |
| 2003/0188155 A1* | 10/2003 | Petit | 713/155 |
| 2003/0236979 A1* | 12/2003 | Himmel et al. | 713/167 |
| 2004/0123104 A1* | 6/2004 | Boyen et al. | 713/165 |
| 2004/0267670 A1* | 12/2004 | Minyailov | 705/51 |
| 2005/0071129 A1* | 3/2005 | Yeap et al. | 702/188 |
| 2005/0216747 A1* | 9/2005 | Yeap et al. | 713/185 |
| 2005/0240996 A1* | 10/2005 | Hitchcock | 726/17 |
| 2006/0149848 A1* | 7/2006 | Shay | 709/229 |

OTHER PUBLICATIONS

Lorch et al., First Experiences Using XACML for Access Control in Distributed Systems, Oct. 2003, ACM Workshop on XML Security (XMLSEC '03), pp. 25-27.*

W. Yeong, et al., "Lightweight Directory Access Protocol", *Network Working Group*, Mar. 1995, pp. 1-22.

"On-Demand Data Integration", 2006, *Informatica Corporation, The Data Integration Company*, pp. 1-2.

"Informatica Viewpoint", 2006, *Informatica Corporation, The Data Integration Company*, pp. 1-2.

"Informatica PowerCenter 8", 2006, *Informatica Corporation, The Data Integration Company*, pp. 1-3.

"Hospitality Division's Secure Online Access Project", 2005 *A Search for the News*, pp. 1-3.

* cited by examiner

METHOD FOR MANAGING DATA IN A SHARED COMPUTING ENVIRONMENT

FIELD OF THE INVENTION

The present invention relates generally to managing data in a shared computing environment and, more particularly, to defining and centrally storing data in a directory server, such as a Lightweight Directory Access Protocol (LDAP) server.

BACKGROUND

Various systems have been developed to protect data. For example, authentication and authorization policies are used to verify users and control access to particular resources. Authentication involves confirming the identity of a user. Once the identity of the user is confirmed by authentication, the authenticated user can proceed with certain actions according to authorization policies. For example, an authorization policy may grant the user certain privileges to access and/or change certain data.

In shared computing environments, protecting data can be particularly important since multiple people or groups of people may access the data. Examples of secret data in a shared computing environment include passwords, an administrative password for various applications (such as Oracle database administration password), pass-phrases for encryption keys and certificates, etc. In many instances, secret data must be shared with one or more individuals, such as IT professionals and administrators, and must be shared in a manner that maintains the integrity of the data.

One manner of transmitting secret data is to tell or "push" the secret data to each individual that should receive the secret data. This may be done by speaking with or calling the individual. Other approaches include writing the secret data on a note or e-mail. However, such methods are not effective since the person who is to be reached may not be available, it may be difficult to reach all of the people within a certain period of time, and the secret data can be delivered to or taken by an unauthorized person. Additionally, individuals who have the secret data may leave a company or change responsibilities but still retain the secret data. Additionally, with these conventional methods, there is no audit trail identifying who received the secret data and when the data was received. These known "push" methods, therefore, are not effective and are not efficient.

Figure 1:
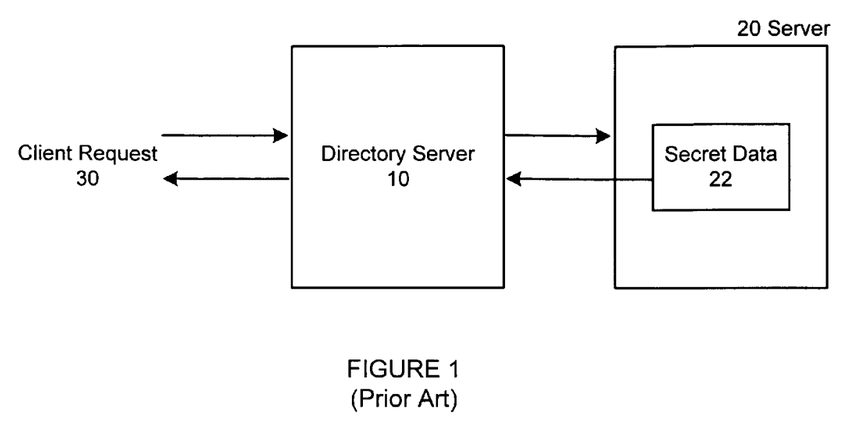
FIG. 1 is a block diagram illustrating a known system in which a user request for data is routed to a server through an intermediate directory.

Referring to FIG. 1, certain other known methods involve using a directory server 10, which uses the Lightweight Directory Access Protocol (LDAP). A LDAP server 10 directs client requests 30 for data 22 to another server 20 that stores the data 22, which is then retrieved and provided to the user to satisfy the request. LDAP is an Internet protocol that e-mail and other programs used to look up information from a server 20. LDAP defines the language or protocol (X.500) that is used by client programs 30 to communicate with servers 20 using the LDAP server 10 as an index or directory to the requested data 22 in another server 20 or datastore or database. LDAP provides authorization and authentication policies that must be satisfied before a LDAP server 10 can be utilized. When a LDAP server receives a request from a client, the server responds to the client with a pointer to where the client can obtain more information. Further details regarding LDAP are not provided here since LDAP is well known in the art. However, as shown in FIG. 1, the LDAP server 10 is used as a directory and refers to another data store or other server 20 that actually stores the data 22. There is no central storage of secret data 22, and LDAP servers 10 are not used for actual data 22 storage. Further, a LDAP server 10 does not provide for centrally storing encrypted data.

Thus, known methods and systems do not store secret data 22 and administration policies to LDAP servers 10 and allow the data 22 to be retrieved directly from these servers 10. Instead, known systems store secret data 22 on other servers 20 and databases, thus presenting greater security risks since there is no central and controllable storage of secret data and access policies.

Accordingly, there exists a need for an improved method for protecting secret data within a shared computing environment. Secret data and administration policies should be securely stored in a central location on a directory server, and if the secret data is changed, the same protection measures should apply to access the changed secret data.

SUMMARY

According to one embodiment, secret data and administration or protection policies are defined on a directory server. Administration policies define when a request to access the secret data will be granted. Secret data is accessible directly from the directory server without accessing another server or datastore if the request satisfies the administration policies.

According to another embodiment, a method of storing and protecting secret data in a shared computing environment includes defining and storing secret data and administration policies on a LDAP server and encrypting the secret data. Encrypted secret data and administration policies are centrally stored on the LDAP server. Administration policies define when a request to access the encrypted secret data is granted. Encrypted secret data is accessible directly from the LDAP server without accessing another server or datastore if the request satisfies administration policies.

Another embodiment is directed to a method of storing and protecting secret data in a shared computing environment that includes defining secret data and administration policies on a LDAP server and encrypting the secret data. Administration policies define when a request to access the encrypted secret data will be granted. The administration policies include authorization, authentication and security zone policies. A security zone is defined for entities with a common security characteristic and defines a group of users and encrypted secret data that is accessible by each user. All of the administration policies and the encrypted secret data are centrally stored on the LDAP server so that the secret data is accessible directly from the LDAP server without accessing another server or datastore if the request satisfies administration policies.

In various embodiments, secret data and administration policies are defined according to a schema of the directory server. Thus, the secret data and administration policies can be programmed into the directory server rather than copied from an external source. The secret data can be a password or other data to be protected. Administration policies can be authorization (e.g., access policies), authentication (e.g., user name and password) and security zone policies. The directory server can be a LDAP server or other suitable directory server.

A security zone can be defined for entities with a common security characteristic. A security zone defines a group of users and the secret data that is accessible by the group of users. A security zone can define multiple groups of users, and there can be multiple security zones on a directory server, each security zone having various numbers of groups of users. Users can issue requests to access the secret data directly from the directory server or through an Internet connection. If the secret data is changed (e.g., by an administrator), the same administration policies are applied to protect the centrally stored data. Thus, embodiments provide a security system that is a "pull" system since users pull or retrieve secret data from a central location, as opposed to a "push" system that pushes secret data from one location to a plurality of users.

BRIEF DESCRIPTION OF THE DRAWINGS

Referring now to the drawings, in which like reference numbers represent corresponding parts throughout, and in which.

DETAILED DESCRIPTION OF ILLUSTRATED EMBODIMENTS

Embodiments of the invention provide for defining and storing secret data and administration policies in a central location, i.e., in a directory server, such as a LDAP server. Embodiments of the invention use directory servers in a new and advantageous way by centrally storing secret data or date to be protected and administration policies on a directory server itself. This is particularly beneficial in a shared computing environment since all of the secret data and the administration policies are centrally stored in one place, and the secret data can be pulled from a central location in a secure manner. Thus, embodiments eliminate the need to push secret data from one location to multiple locations (some of which may not be secure or incorrect) and improve upon prior systems that use a directory server and point to other servers that contain requested data. Embodiments eliminate the need to access other servers or data stores that are referenced by a directory server. Instead, embodiments maintain secret data and credentials and entitlement to access that data in a single, secure location.

Figure 2:
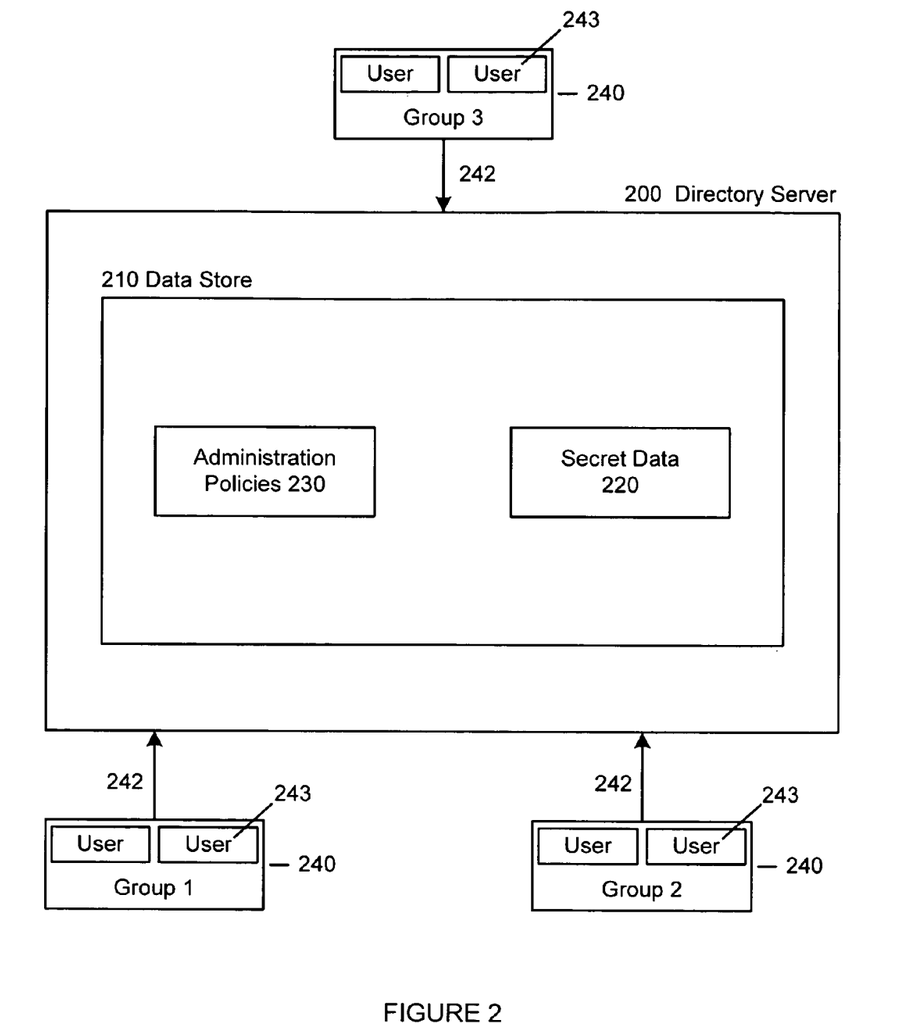
FIG. 2 is a block diagram illustrating secret data and administration policies defined and stored on a directory server according to one embodiment.

Referring to FIG. 2, according to one embodiment, a directory server 200 includes a data store or disk 210. Secret data 220 and administration policies 230 are defined on the data store 210. "Secret" data as used in this specification is data that is to be protected. Further, persons skilled in the art will appreciate that the relative sizes of the components illustrated in the drawings, such as data store 210, may not be representative of an actual directory server 200.

Requests 242 issued by users 243 or groups 240 of users 243 must satisfy the administration policies 230 before a request 242 to access the secret data 220 is granted. For example, a certain group 240 of users may have to satisfy a first set of administration policies, and another group 240 of users may have to satisfy a second set of administration policies. The secret data 220 and administration policies 230 are stored in a central location, i.e., within the directory server 200, so that it is not necessary to access another external data store or server to retrieve the secret data 220. In other words, the directory server 200 is not used as a directory (as is its normal function) to point or refer to another location or server that actually stores the data.

In the illustrated embodiment, the secret data 220 and the administration policies 230 are stored on the same data store 210 of the directory server 200. In alternative embodiments, the secret data 220 and administration policies 230 can be stored centrally within the directory server 200, but on one or more data stores 210 of the same directory server 200. As a result, user credentials, entitlement and the secret data are all securely stored in a single, central location on the directory server 200.

According to one embodiment, secret data 220 and administration policies 230 are defined on a directory server 200 using a protocol or language of the directory server, or according to the directory server schema. The defined data 220 and policies 230 are stored on the directory server 200 itself. Thus, it is not necessary to externally generate or program secret data and policies and copy them into the directory server.

According to one embodiment, the directory server 200 is a Lightweight Directory Access Protocol (LDAP) server. Persons skilled in the art will appreciate that embodiments of the invention can be applied to other directory servers and services, such as directory servers and services that are used in Unix and Microsoft applications. For purposes of explanation and illustration, not limitation, this specification refers to LDAP servers and the associate LDAP schema.

Figure 3:
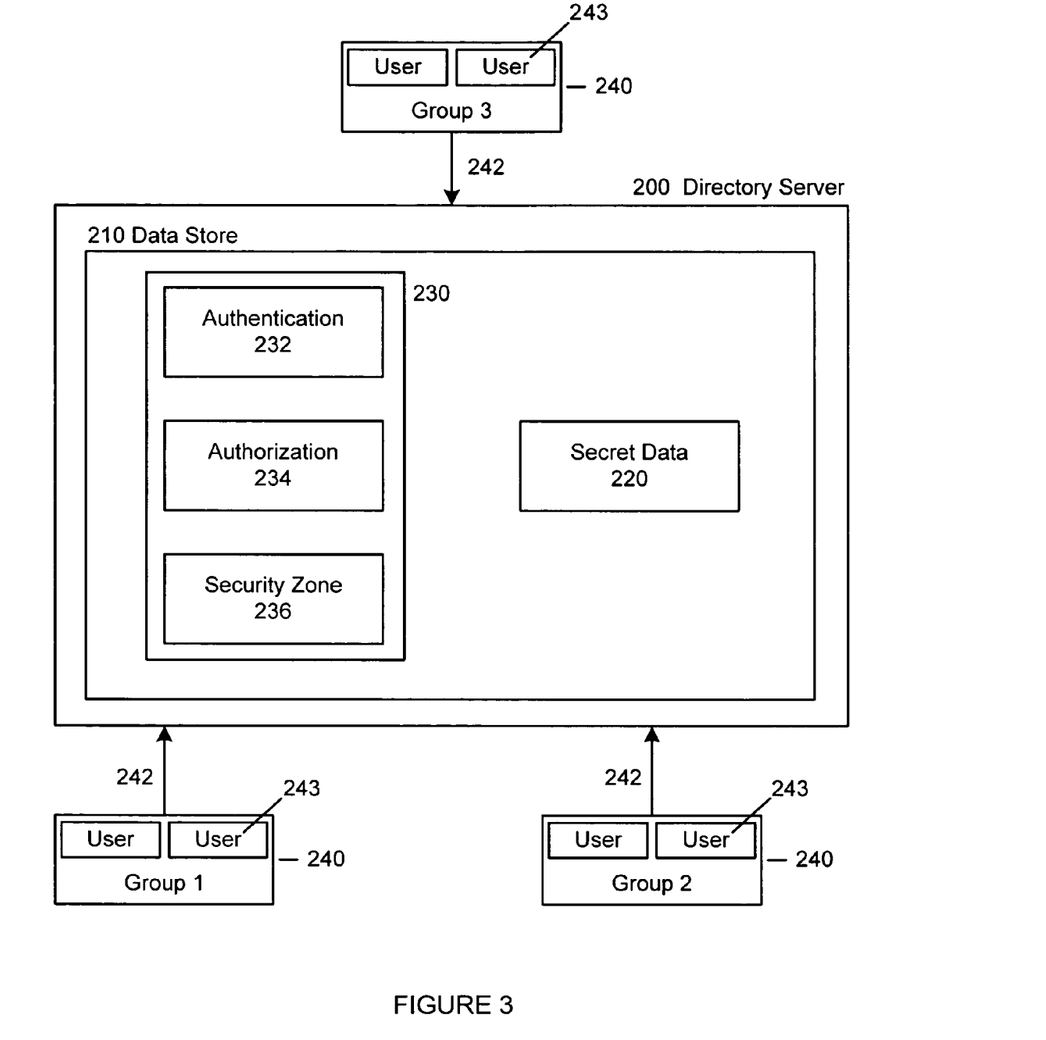
FIG. 3 is a block diagram illustrating secret data and authentication, authorization and security zone policies defined and stored on a directory server according to one embodiment.

Referring to FIG. 3, administration policies 230 that can be defined on the LDAP server 200 according to an LDAP schema include authentication 232, authorization 234 security zone 236 policies. Various authentication 232 and authorization 234 policies can be defined. For example, authentication 232 can be defined as a user name and password. Other authentication 232 policies can also be defined, including digital certificates and biometrics, such as iris and retinal patterns, voice recognition, fingerprints, typing patterns, etc. Authorization 234 policies that are defined can control what access is granted to an authenticated user. Exemplary authentication 234 policies include access privileges, the ability to change authentication 232 and/or authorization 234 policies, and the ability to change the secret data 220. The authorization or control level may be based on, for example, the user's title, security clearance, data access requirements, etc. For example, the primary administrator of the system may have full authorization to change secret data 220 and policies 230, whereas lower level administrators and employees do not have these privileges. Persons skilled in the art will appreciate that the particular authentication 232 and authorization 234 policies that are defined using the directory service schema can vary depending on the particular security needs, applications, security levels, number of users, etc.

A security zone 236 is defined on the directory server 200 according to a directory service schema and is defined for entities (e.g., servers) with a common security characteristic. For example, a group of Unix systems or entities may require the same root password, and a group of Apache web servers in a particular business unit may require an administration password. A security zone 400 can also be defined for passwords or phrases for private encryption keys for a business unit or company. Persons skilled in the art will appreciate that security zones 400 can be defined for various entities and groups of entities having various security characteristics, and that the above examples are not intended to be limiting.

Figure 4:
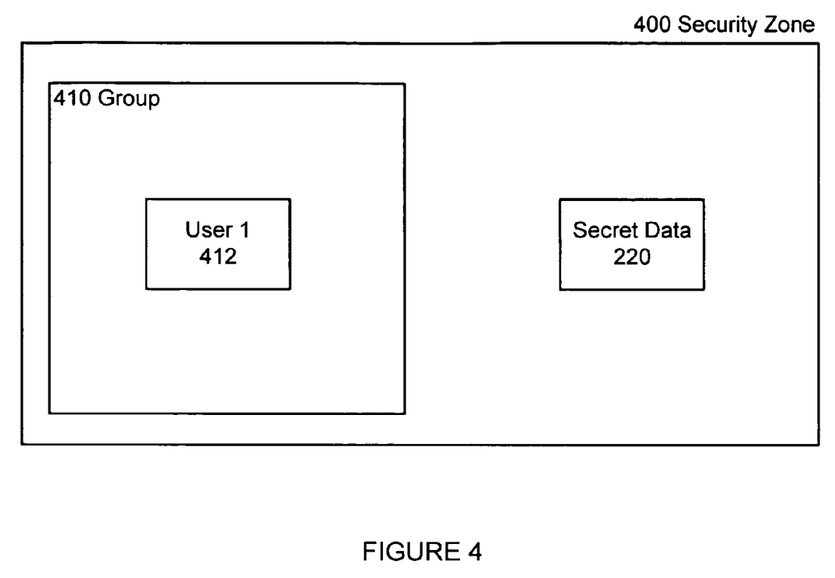
FIG. 4 illustrates a security zone defined on a directory server and the security zone defining a group with one user and secret data accessible by that user.

More particularly, as shown in FIG. 4, security zone 400 can define certain secret data 220 (such as a password) that is needed by a certain group 410 of users 412. Groups 410 can include different numbers of users 412. FIG. 4 illustrates a security zone that is defined with one user, or a group with one user.

Figure 5:
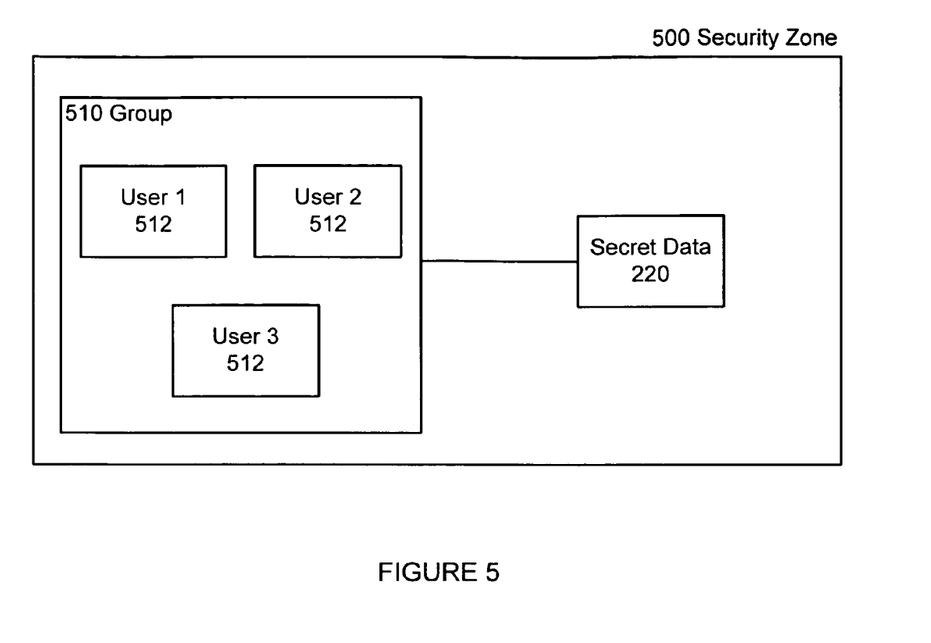
FIG. 5 illustrates a security zone defined on a directory server and the security zone defining a group of multiple users and secret data accessible by users in that group.

FIG. 5 illustrates a security zone 500 that defines a group 510 of multiple users 512 and the secret data 220 that these users 512 can access. Persons skilled in the art will appreciate that the number of groups and users in a group can vary depending on, for example, the sensitivity of the secret data, the number of users, the use of the secret data, etc.

Figure 6:
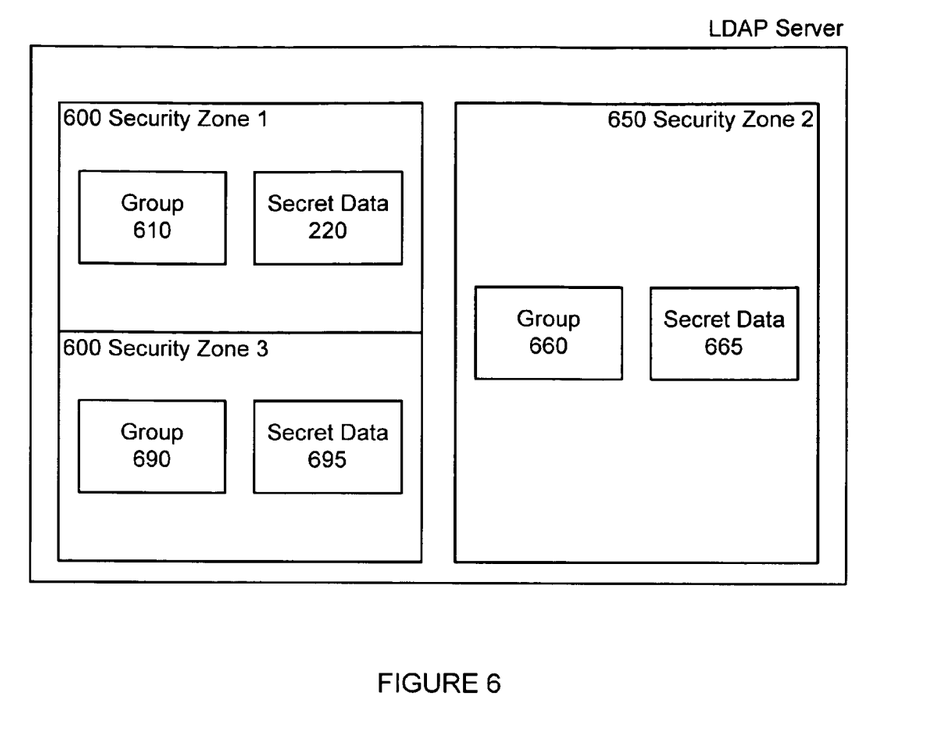
FIG. 6 illustrates multiple security zones defined on a directory server according to one embodiment.

Further, referring to FIG. 6, one or multiple security zones 600, 650 and 680 can be defined on a LDAP server 200. In the illustrated embodiment, each security zone is defined for different secret data 220, 665 and 695. In other embodiments, certain groups may have access to the same secret data, but have different privileges and, therefore, be assigned to a different group. In the event that multiple groups can access the same secret data, the security zone can be defined such that the secret data is accessed by one group of users at a time in order to ensure data integrity.

Figure 7:
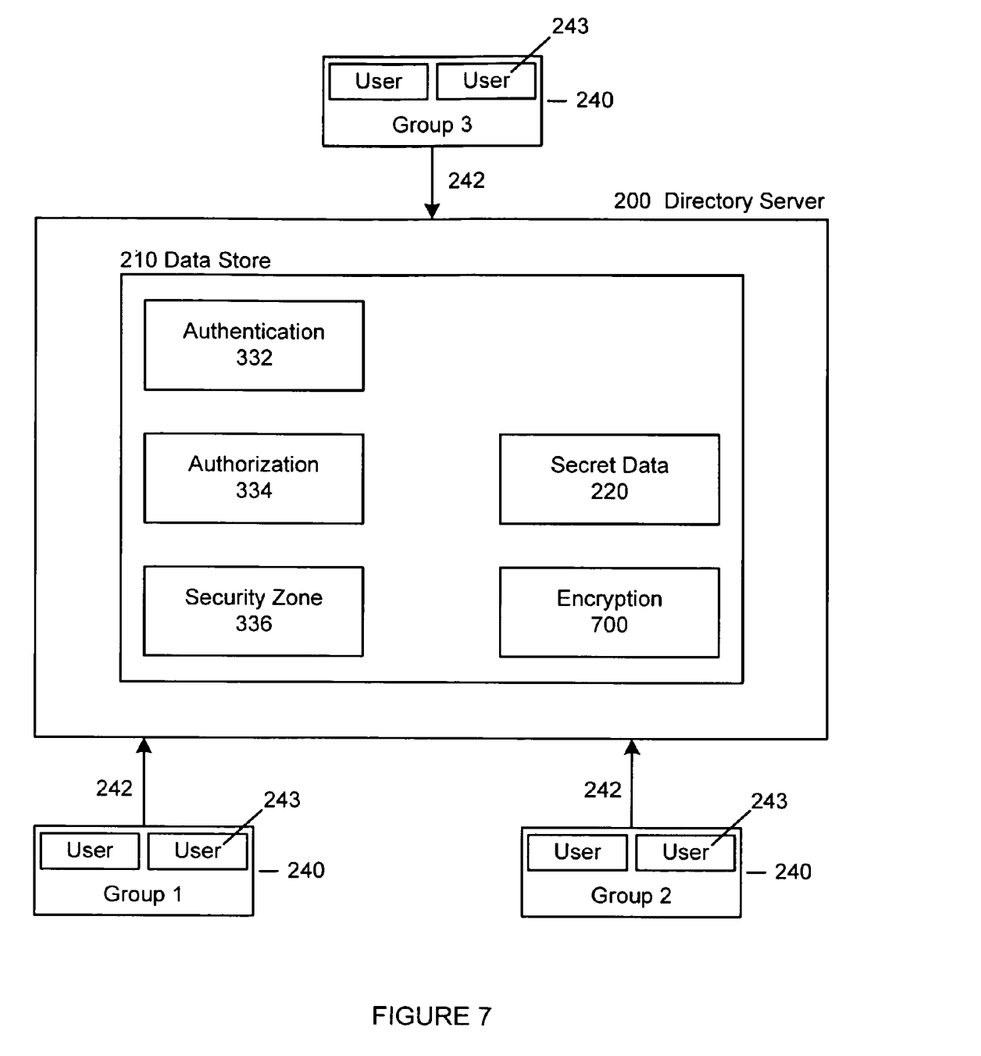
FIG. 7 is a block diagram illustrating secret data and administration policies defined on a directory server, and the secret data being encrypted.

Referring to FIG. 7, in various embodiments, the secret data 220 defined on the directory server 200 can be encrypted 700 using various known encryption techniques after the secret data 220 is defined on the directory server 200. When the secret data 220 is retrieved, the encrypted data is decrypted using various known decryption techniques. As shown in FIG. 7, the administration policies 210 (such as authentication, authorization, security zones) and secret data 220 (whether unencrypted or encrypted) are all maintained within a central location on the directory server 200.

Figure 8:
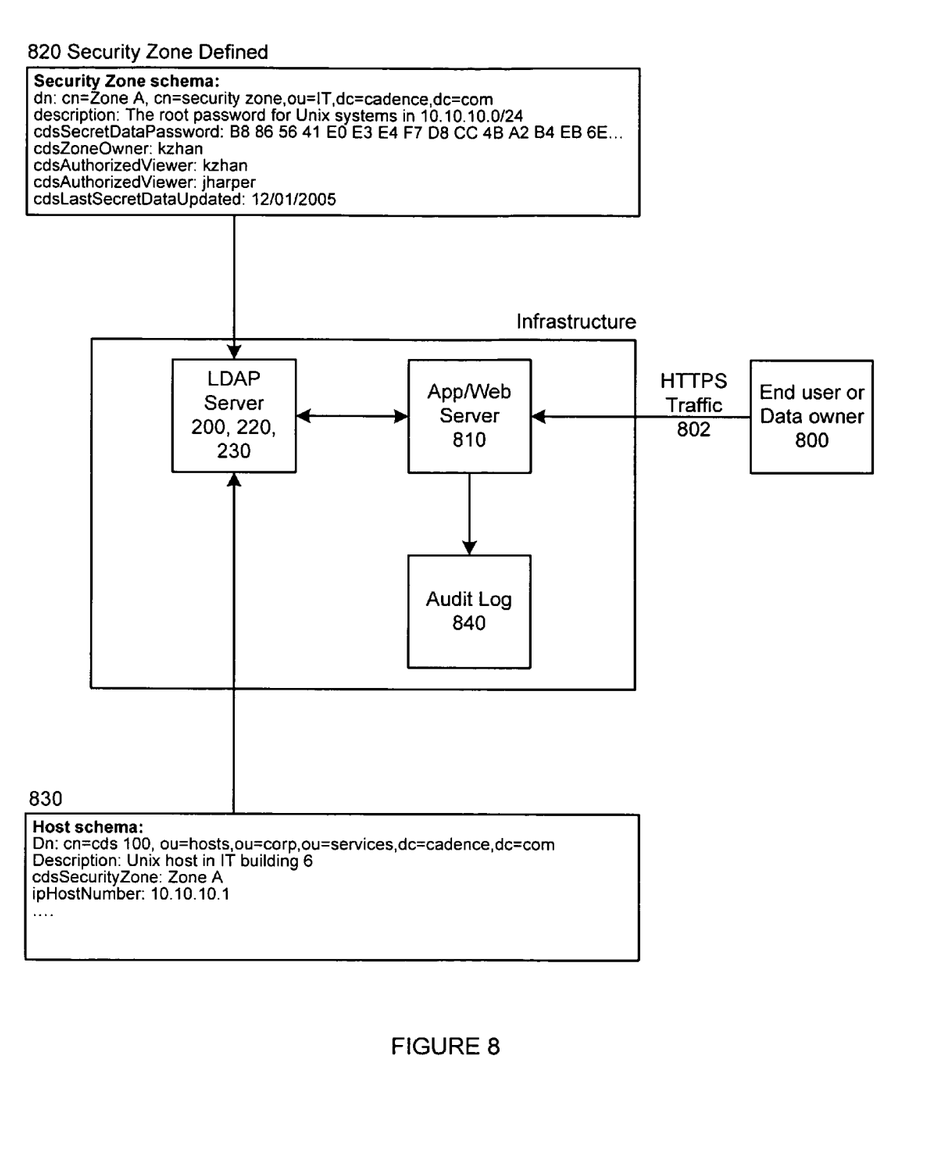
FIG. 8 is a system diagram illustrating a security zone is defined on a directory server and how requests submitted over the Internet to access secret data on a directory server are processed according to one embodiment.

FIG. 8 illustrates an exemplary implementation of embodiments in the context of accessing a LDAP server 200 through an Internet connection. In this example, a user 800 submits a HTTPS request 802 via an application or web server 810, which communicates with the LDAP server 200. The LDAP server 200 stores the defined administration policies 230 and secret data 220. In the illustrated embodiment, a security zone 820 is defined according to LDAP host schema 830. In this example, the security zone 820 is called Zone A. This exemplary security zone 820 is defined for a group of UNIX systems in subnet 10.10.10.0/24 for which a root password (the secret data 220) is to be shared. In this example, a team of UNIX system administrators, "uid=kzhan" and "uid=jharper", can access this root password 220. The security Zone A 820 is defined and stored on the LDAP server 200 as follows (using LDAP syntax):

dn: cn=Zone A, cn=security zone,ou=IT,dc=cadence, dc=com
    description: The root password for Unix systems in 10.10.10.0/24
    cdsSecretDataPassword: B8 86 56 41 E0 E3 E4 F7 D8 CC 4B A2 B4 EB 6E . . .
    cdsZoneOwner: kzhan
    cdsAuthorizedViewer: kzhan
    cdsAuthorizedViewer: jharper
    cdsLastSecretDataUpdated: Dec. 1, 2005

A host entry in 10.10.10.0/24 for this example is as follows:
dn: cn=cds100+ipHostNumber=10.10.10.1,ou=hosts, ou=IT,dc=cadence,dc=com
    description: a host entry
    cdsSecurityZone: Zone A
dn: cn=cds200+ipHostNumber=10.10.10.2,ou=hosts, ou=IT,dc=cadence,dc=com
    description: another host entry
    cdsSecurityZone: Zone A
dn: cn=cds300+ipHostNumber=10.10.10.3,ou=hosts, ou=IT,dc=cadence,dc=com
    description: one more host entry
    cdsSecurityZone: Zone B In this example, the secret data 220 is encrypted using a security key resulting in encrypted data, cdsSecretDataPassword. When the user 800 attempts to retrieve the encrypted secret data 220 (root password for host cds100), a policy engine that functions according to the defined administration policies 230 challenges the user 800 with authentication policies 232. If the user 800 satisfies these policies 232 (e.g., with a user name, password, biometrics, etc.), the policy engine checks the security zone 820 to verify whether the user 800 satisfies authorization policies 234 based on whether the user 800 matches the cdsAuthroizedViewer attribute. If the attribute is matched, the secret data 220 is decrypted, released from the LDAP server 200 and provided to the user 800. This transaction can then be logged 840 so that the administrators can determine who accessed the secret data 220 and when the access occurred.

Figure 9:
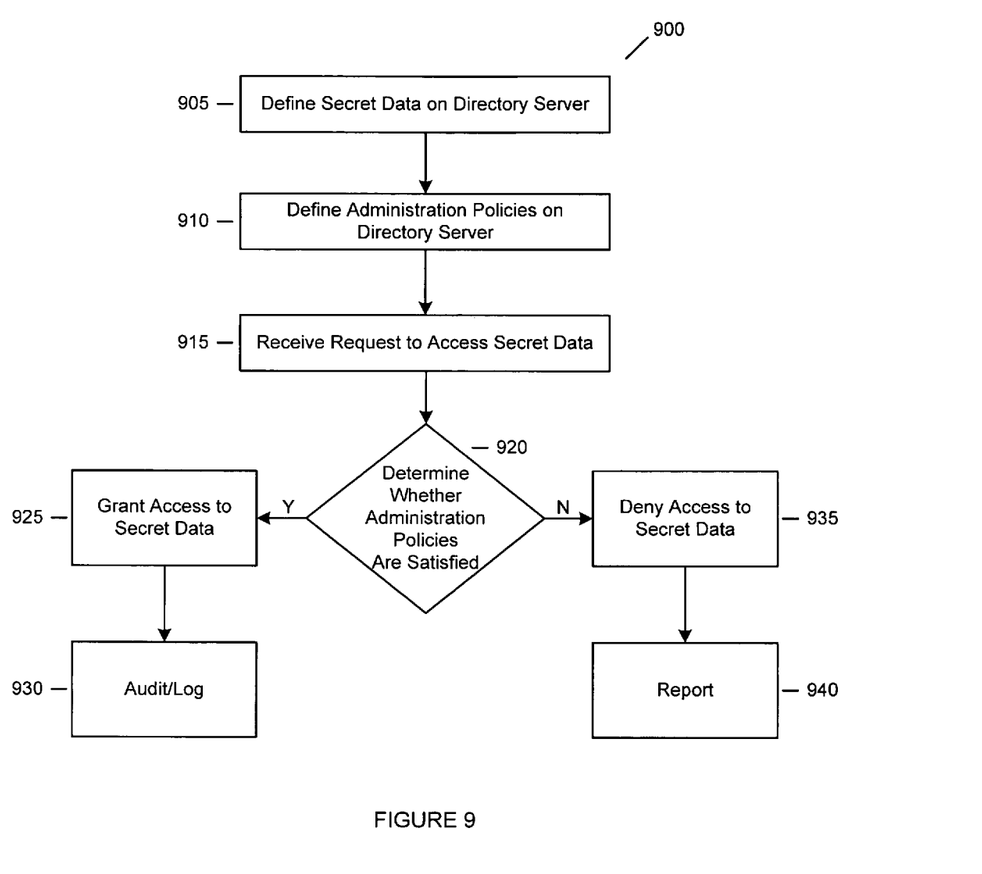
FIG. 9 is a flow chart illustrating a method of protecting secret data according to one embodiment.

FIG. 9 is a flow chart illustrating the method 900 steps discussed above for defining and protecting secret data in a shared computing environment. In step 905 the secret data is defined on the directory server, such as a LDAP server, using the directory server schema. In step 910, administration policies (such as authentication, authorization, security zones) are defined using the directory schema. Thus, the secret data and administration policies are defined or generated using the LDAP schema and stored on the LDAP server rather than an external server or datastore. In step 915, a request is received to access the secret data. The request can be sent directly to the LDAP server or via an Internet connection as shown in FIG. 8. In step 920, a determination is made whether the user satisfies the administration policies. If so, in step 925, the data is provided to the user, and in step 930, the transaction is logged. If not, in step 935, access is denied, and in step 940, a report can be generated identifying the user and the denied access.

Figure 10:
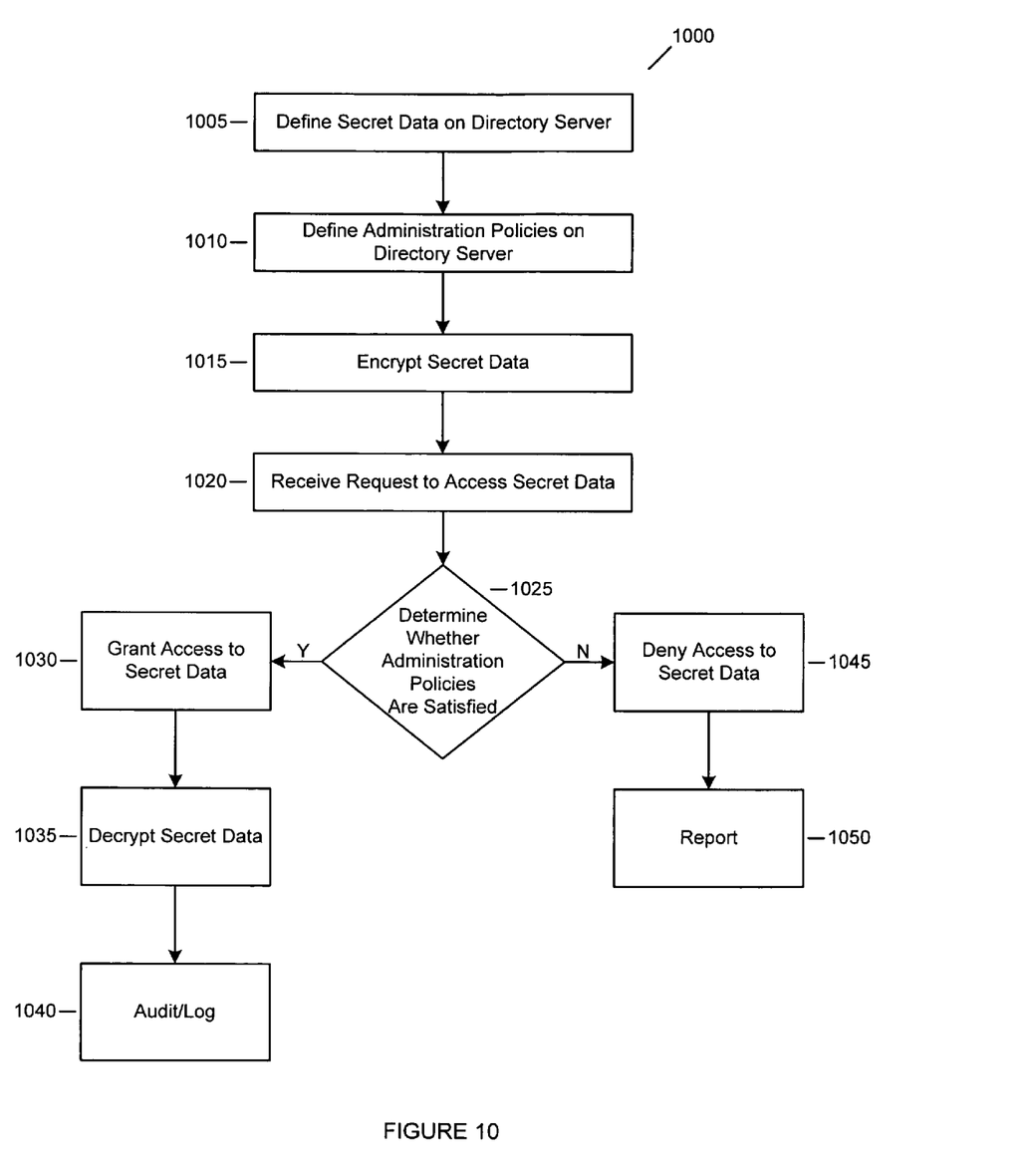
FIG. 10 is a flow chart illustrating a method of protecting encrypted secret data according to another embodiment.

FIG. 10 illustrates a flow chart of a method 1000 for defining and protecting secret data in a shared computing environment that also involves encryption and decryption of secret data. In step 1005, the secret data is defined on the directory server, such as a LDAP server, using the directory server schema. In step 1010, administration policies (such as authentication, authorization, security zones) are defined using the directory schema, and the secret data and administration policies are defined or generated using the LDAP schema and stored on the LDAP server. In step 1015, the secret data is encrypted using various known encryption techniques. In step 1020, a request is received to access the encrypted secret data. In step 1025, a determination is made whether the user satisfies the administration policies. If so, in step 1030, the data is decrypted. In step 1035, the decrypted secret data is provided to the user, and in step 1040, the transaction is logged. If not, then in step 1045, access is denied. In step 1050, a report can be generated identifying the user and denied access.

Persons skilled in the art will appreciate that the method steps shown in FIGS. 9 and 10 do not necessarily occur in the exact order shown. For example, with reference to FIG. 10, data can be encrypted at various stages, and secret data and administration policies can be defined in different orders. Thus, the particular sequences shown in FIGS. 9 and 10 are provided for purposes of explanation and illustration, not limitation, and different or additional process actions, or a different combination or ordering of process actions can be used to enact the embodiments. Additionally, persons skilled in the art will appreciate that embodiments can be applied to various directory servers and that a LDAP server is one example of a directory server in which embodiments can implemented.

What is claimed:

1. A computer implemented method of storing, protecting, and accessing secret data in a shared computing environment, comprising:
    defining, for a piece of secret data, a security zone for one or more entities with a common security characteristic, wherein the security zone defines a plurality of groups of users that can access the piece of secret data, wherein the piece of secret data is used to access the one or more entities defined by the security zone, and wherein at least two groups of users of the plurality of groups of users can access the piece of secret data using different access privileges, the different access privileges allowing the at least two groups of users to perform different functions on the piece of secret data;
    determining whether a request by a user to access the piece of secret data used to access the one or more entities defined by the security zone will be granted, wherein
    the piece of secret data and one or more administration policies are centrally stored on a directory server,
    the one or more administration policies comprise one or more user authentication policies that are used to authenticate the requesting user on the directory server,
    the one or more administration policies further comprise the security zone, which defines the piece of secret data that is accessible by the requesting user; the one or more administration policies further comprise one or more authorization policies that control access to the piece of secret data defined by the security zone, in which the requesting user is permitted to access the piece of secret data used to access the one or more entities defined by the security zone, without going to an external computing node, upon satisfaction of the one or more authorization policies,
    distributing the piece of secret data to the requesting user without pushing the piece of secret data to the requesting user, wherein
    the requesting user shares the piece of secret data in the shared computing environment, and
    defining one or more additional security zones, each additional security zone determining or identifying: a group of users, and an additional piece of secret data that is accessible by the group of users.

2. The method of claim 1, wherein the piece of secret data comprises:
    a password.

3. The method of claim 1, wherein the act of determining whether a request by a user to access the piece of secret data used to access the one or more entities defined by the security zone will be granted further comprising:
    determining or identifying an authorization policy; and
    determining or identifying an authentication policy.

4. The method of claim 3, the act of determining or identifying the authentication policy further comprising determining or identifying an identity of the user.

5. The method of claim 4, the act of determining or identifying the identity of the user further comprising:
    determining or identifying a user name; and
    determining or identifying a password for the user name.

6. The method of claim 3, the act of determining or identifying the authorization policy further comprising:
    determining or identifying an authorization policy that determines whether the request to access the directory server will be granted.

7. The method of claim 1, wherein the secret data is accessible by one group of users of the plurality of groups of users at a time.

8. The method of claim 1, wherein one group of users of the plurality of groups of users includes one user.

9. The method of claim 1, wherein one group of users of the plurality of groups of users includes a plurality of users.

10. The method of claim 1, further comprising encrypting the piece of secret data.

11. The method of claim 1, the user request is sent over the Internet through a web server.

12. The method of claim 1, further comprising:
    changing the piece of secret data; and
    maintaining the one or more administration policies administration policies so that the same one or more administration policies must be satisfied in order to access the changed piece of secret data.

13. The method of claim 1, wherein the directory server is an LDAP server.

14. A system for storing, protecting, and accessing secret data in a shared computing environment, comprising:
    a computer server that is programmed for performing:
    defining, for a piece of secret data, a security zone for one or more entities with a common security characteristic, wherein the security zone defines a plurality of groups of users that can access the piece of secret data, wherein the piece of secret data is used to access the one or more entities defined by the security zone, and wherein at least two groups of users of the plurality of groups of users can access the piece of secret data using different access privileges, the different access privileges allowing the at least two groups of users to perform different functions on the piece of secret data;
    determining whether a request by a user to access the piece of secret data used to access the one or more entities defined by the security zone will be granted, wherein
    the piece of secret data and one or more administration policies are centrally stored on a directory server,
    the one or more administration policies comprise one or more user authentication policies that are used to authenticate the requesting user on the directory server,
    the one or more administration policies further comprise the security zone, which defines the piece of secret data that is accessible by the requesting user; the one or more administration policies further comprise one or more authorization policies that control access to the piece of secret data defined by the security zone, in which the requesting user is permitted to access the piece of secret data used to access the one or more entities defined by the security zone, without going to an external computing node, upon satisfaction of the one or more authorization policies, and distributing the piece of secret data to the requesting user without pushing the secret data to the requesting user, wherein the requesting user shares the piece of secret data in the shared computing environment, and defining one or more additional security zones, each additional security zone determining or identifying: a group of users, and an additional piece of secret data that is accessible by the group of users.

15. The method of claim 1, wherein accessing the one or more entities defined by the security zone using the piece of secret data comprises administering the one or more entities.

16. The method of claim 15, wherein the one or more entities defined by the security zone comprise a server.

17. The method of claim 15, wherein the piece of secret data that is used to access the one or more entities defined by the security zone comprises an administration password.

18. The method of claim 1, wherein accessing the one or more entities defined by the security zone using the piece of secret data comprises accessing data stored within the one or more entities.

19. The method of claim 1, wherein the piece of secret data that is used to access the one or more entities defined by the security zone comprises a phrase for a private encryption key.

20. The system of claim 14, wherein accessing the one or more entities defined by the security zone using the piece of secret data comprises administering the one or more entities.

21. The system of claim 20, wherein the one or more entities defined by the security zone comprise a server.

22. The system of claim 20, wherein the piece of secret data that is used to access the one or more entities defined by the security zone comprises an administration password.

23. The system of claim 14, wherein accessing the one or more entities defined by the security zone using the piece of secret data comprises accessing data stored within the one or more entities.

24. The system of claim 14, wherein the piece of secret data that is used to access the one or more entities defined by the security zone comprises a phrase for a private encryption key.

* * * * *

UNITED STATES PATENT AND TRADEMARK OFFICE
CERTIFICATE OF CORRECTION

| | | |
|---|---|---|
| PATENT NO. | : 8,352,999 B1 | Page 1 of 1 |
| APPLICATION NO. | : 11/490676 | |
| DATED | : January 8, 2013 | |
| INVENTOR(S) | : Kaijun Zhan et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1079 days.

Signed and Sealed this
Eleventh Day of November, 2014

Michelle K. Lee
*Deputy Director of the United States Patent and Trademark Office*